(12) United States Patent
Lowell et al.

(10) Patent No.: US 7,451,443 B2
(45) Date of Patent: Nov. 11, 2008

(54) ONLINE COMPUTER MAINTENANCE UTILIZING A VIRTUAL MACHINE MONITOR

(75) Inventors: David E. Lowell, San Francisco, CA (US); Caroline M. Tic, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 920 days.

(21) Appl. No.: 10/676,665

(22) Filed: Oct. 1, 2003

(65) Prior Publication Data

US 2005/0091354 A1    Apr. 28, 2005

(51) Int. Cl.
G06F 9/44    (2006.01)
G06F 3/00    (2006.01)

(52) U.S. Cl. ............................. 718/1; 719/319; 703/21

(58) Field of Classification Search .................... 718/1; 719/320, 317, 319; 703/21, 22
See application file for complete search history.

(56) References Cited

U.S. PATENT DOCUMENTS

| 4,347,565 | A  | * | 8/1982 | Kaneda et al. | ................. 711/6 |
| 6,698,017 | B1 | * | 2/2004 | Adamovits et al. | .......... 717/168 |
| 2002/0069369 | A1 | * | 6/2002 | Tremain | ..................... 713/201 |

* cited by examiner

*Primary Examiner*—Meng-Ai An
*Assistant Examiner*—Mengyao Zhe

(57) ABSTRACT

Online computer maintenance is performed on at least one node. A virtual machine monitor is run; a first operating instance is run on the virtual machine monitor; and a second operating system instance is run on the virtual machine monitor as a substitute for the first instance. The maintenance is performed with respect to one of the instances while using the other of the instances.

43 Claims, 7 Drawing Sheets

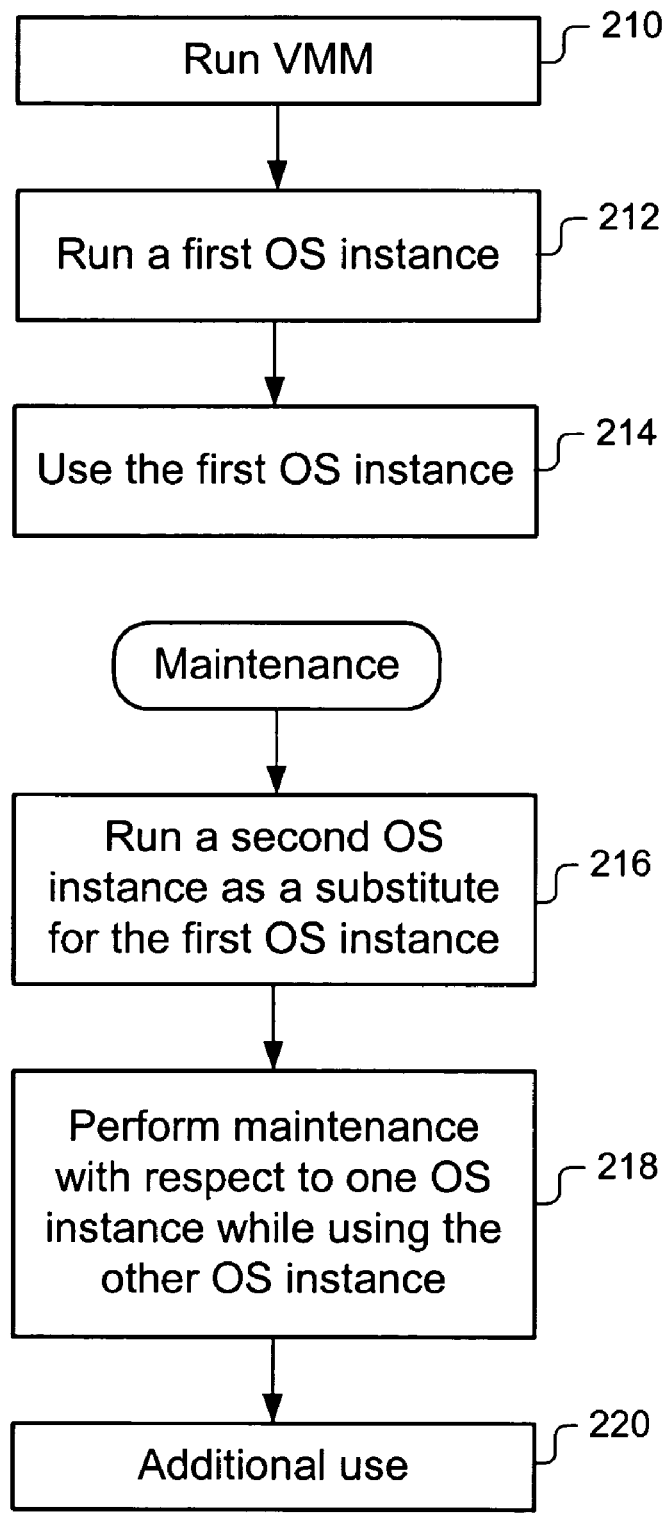

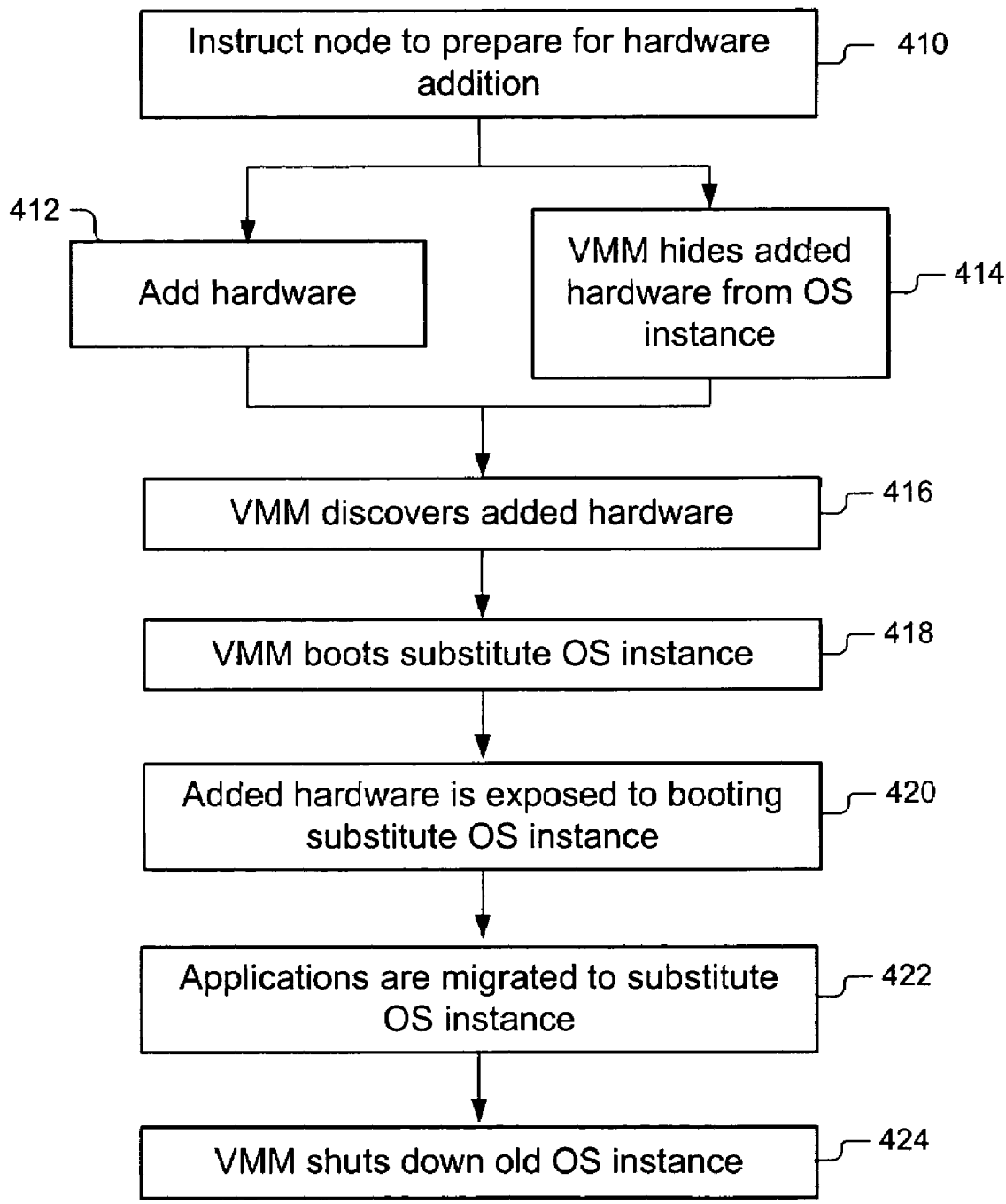

ONLINE COMPUTER MAINTENANCE UTILIZING A VIRTUAL MACHINE MONITOR

BACKGROUND

Typical maintenance operations on server-class computers include replacing faulty hardware and adding new hardware (e.g., I/O adapter boards, memory cards, CPUs), upgrading and patching operating systems, upgrading and patching software applications, and performing server reconfiguration. The maintenance may be performed offline. Offline maintenance on a server can involve stopping or rebooting the server's operating system, and shutting off power to the server. These steps lead to an accumulation of "downtime" (that is, time during which the applications are not providing service). While the server is down, hardware or software or both can be serviced. After servicing, the server may be rebooted, and the applications restarted.

It is desirable for businesses to minimize server downtime. Downtime can cause interruptions in critical services, result in a loss of customers (who, inconvenienced by poor service, seek better service elsewhere), and reduce productivity of employees. In addition, the downtime can increase the cost of server operation.

Servers having online maintenance capability can avoid downtime in certain instances. The online maintenance capability can be engineered into computer hardware and operating systems. A server having online maintenance capability can allow maintenance on particular subcomponents without stopping the system as a whole. For example, a server equipped with "PCI Hot Plug" allows a PCI card to be added or replaced while applications that do not depend on that card continue to run. Similarly, operating systems with "dynamic kernel modules" allow software components in dynamic modules to be added, replaced, or removed at runtime. Only those applications that are dependent on that module need restart.

However, not all servers have online maintenance capability. Retrofitting these online maintenance capabilities into existing servers and their operating systems and applications can be prohibitively challenging. Moreover, a redesigned legacy system having online maintenance features does not help those who want to continue using an existing version of that system.

SUMMARY

According to one aspect of the present invention, online computer maintenance is performed on at least one node. A virtual machine monitor is run; a first operating instance is run on the virtual machine monitor; a second operating system instance is run on the virtual machine monitor as a substitute for the first instance, and the maintenance is performed with respect to one of the instances while using the other of the instances.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 2 is an illustration of a method in accordance with an embodiment of the present invention.

FIG. 4 is an illustration of a method of adding hardware in accordance with an embodiment of the present invention.

DETAILED DESCRIPTION

Figure 1:
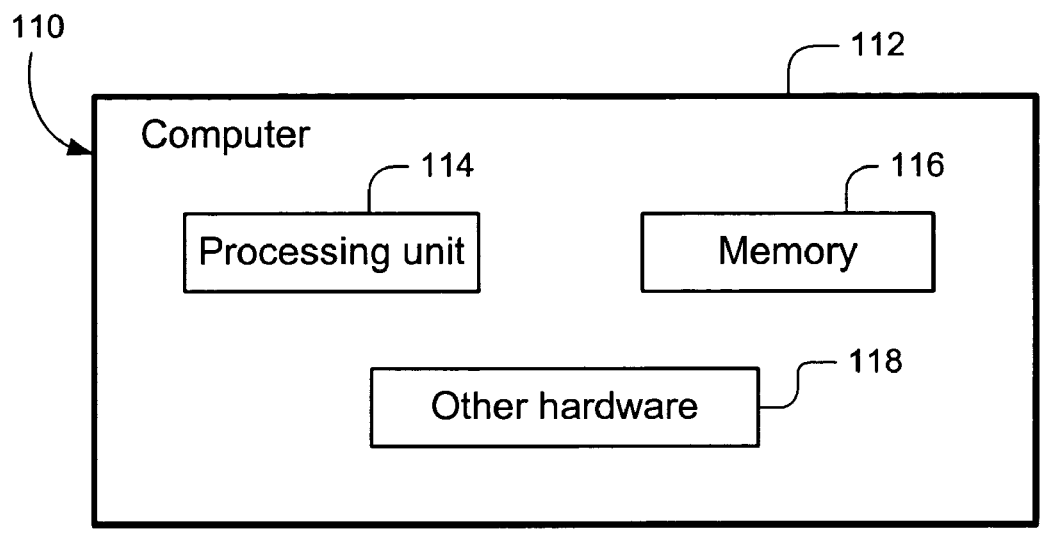
FIG. 1 is an illustration of an exemplary node in accordance with an embodiment of the present invention

As shown in the drawings for purposes of illustration, the present invention is embodied in a method for performing online computer maintenance on a node. The maintenance includes, but is not limited to servicing hardware and software, performing hardware and software reconfiguration, tuning hardware, and modifying software (e.g. upgrading, patching, tuning). Examples of servicing these resources includes adding new memory; replacing or adding I/O devices, adapters and controllers; replacing faulty CPUs in multiprocessors; upgrading, patching, reconfiguring and rebooting operating systems; and upgrading and patching applications.

An exemplary node 110 is illustrated in FIG. 1. The node 110 includes a computer 112 having a processing unit 114, memory 116, and other hardware 118. The processing unit 114 may include a single processor or multiple processors. Memory for storing a virtual machine monitor (VMM), applications, and operating system(s) may be located in the computer 112 or another node. The computer 112 is not limited to any particular type. Examples of computers include file servers, web servers, workstations, mainframes, personal computers, personal digital assistants (PDAs), print servers, and network appliances.

Reference is made to FIG. 2, which illustrates a method of performing online computer maintenance. The VMM is run on the node (210). The VMM is a layer of software that runs between a physical layer (raw hardware) of the computer and an operating system ("OS") layer. The VMM may be loaded during bootup of the computer. At boot time, the VMM can receive control of the hardware, and may maintain hardware control until the computer is shut down.

One or more OS instances are run on the VMM (212). The VMM allows multiple OS instances to run simultaneously in the computer. When the VMM starts an OS instance, it may configure the hardware to trap when the OS instance executes privileged instructions (e.g., instructions that perform I/O, instructions that load a translation lookaside buffer). When one of these traps occurs, the VMM simulates the instruction and thus creates an illusion that the OS instance has sole control of the hardware on which it runs. The OS instances may be instances of the same operating system, or instances of different operating systems.

A first one of the OS instances is used (214). For example, the OS instance may be used by running applications on it. A web server is but one example of an application.

At some point in time, a decision is made to perform online maintenance on the node. For example, the decision might be made by a system administrator.

A second operating system instance is run as a substitute for the first instance (216). The substitute (second) OS instance is intended to provide the same services as the first OS instance by taking over the services temporarily or permanently. The second OS instance is run on the same VMM. The first and second OS instances may be instances of the same or different operating systems.

Maintenance is performed with respect to one of the first and second instances while using the other of those instances (218). Thus, maintenance can be performed with respect to the first OS instance while the second OS instance is being used, or maintenance can be performed with respect to the second OS instance while the first OS instance is being used. The choice will depend upon the type of computer maintenance that is performed. This will become clear from the examples below of hardware and software maintenance.

Since at least one of the first and second OS instances is being used during the maintenance, the maintenance is performed without incurring downtime. As a benefit, applications can be run on the one OS instance while the other OS instance is being serviced.

If online maintenance requires the second OS instance to be used while maintenance is performed with respect to the first OS instance, applications can be migrated from the first OS instance to the second OS instance. This application migration can take several forms. Application migration for web servers, for example, can be as simple as redirecting requests sent to that application to an instance of the application already running on the second OS instance. In other cases, administrators can migrate an application by terminating it on the first OS instance and restarting it on the second OS instance. Data structures of the application may have to be restored on the second OS instance. Transparent process migration can also be used to move running applications from one OS instance to another. With process migration, the first OS instance or runtime environment encapsulates the process user-level and kernel-level data structures, moves them to the second OS instance, and recovers the process there in a manner that is largely or entirely transparent to the application. Techniques from failure recovery literature, such as full-process checkpointing, message logging, and process pairs can be used to implement process migration. Once the applications have been migrated, a user can continue using the applications that are running on the second OS instance.

Application migration could occur from the first OS instance to the second OS instance, and back to the first OS instance. Application migration could occur before the maintenance is performed, or after the maintenance is performed. The specifics will depend upon the type of computer maintenance that is performed. This too will become clear from the examples below of hardware and software maintenance.

Additional steps may be performed after the online maintenance has been completed (220). For example, the first OS instance may be rebooted, and the second OS instance may be shut down. Or the second OS instance may continue in place of the first OS instance. The additional steps will depend upon the type of computer maintenance that is performed, as will become clear from the examples below of hardware and software maintenance.

The steps 216-220 can be initiated by a system administrator. The system administrator can run the substitute OS on the VMM (216), perform the maintenance (218), and complete any additional steps (220). In the alternative, these steps 216-220 can be initiated by software.

The VMM is designed to support these steps 216-220. For example, the VMM might be designed to prevent or shield an OS instance from seeing the hardware to be removed or added; trapping and emulating probes of I/O space by an OS instance; etc. This list of functions is not exhaustive. These additional functions will depend upon the type of computer maintenance that is performed. The VMM could even be designed to initiate these steps 216-220.

The method is not limited to a single node. A single node was described above merely to simplify the description of the online maintenance method. In a cluster environment having multiple nodes, the online maintenance may be performed on multiple nodes simultaneously, without requiring spare nodes. Applications could not only migrate to other nodes in the cluster, but could also migrate from one OS instance to another within the same node.

Several examples of online computer maintenance will now be provided. A first example relates to hardware removal, a second example relates to hardware addition, and a third example relates to software maintenance.

Figure 3A:
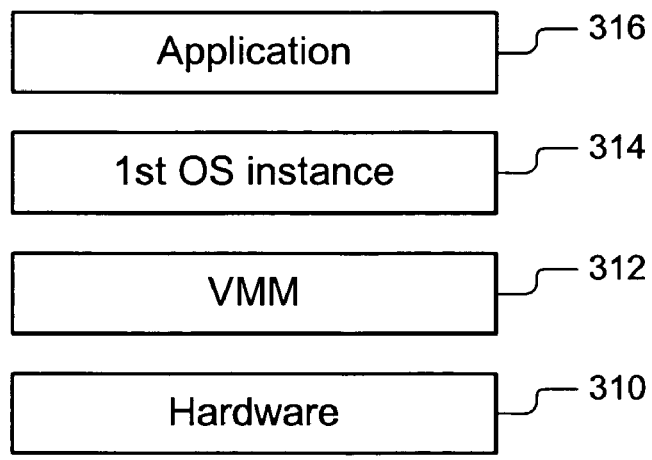
FIGS. 3a-3d are illustrations of a method of servicing hardware in accordance with an embodiment of the present invention.

Reference is now made to FIGS. 3a-3d, which illustrate an example of hardware removal. A computer is already running a VMM 312 on hardware 310, a first OS instance 314 on the VMM 312, and an application 316 on the first OS instance 314 (FIG. 3a). The first OS instance 314 has a dependency on the hardware to be removed.

Figure 3B:
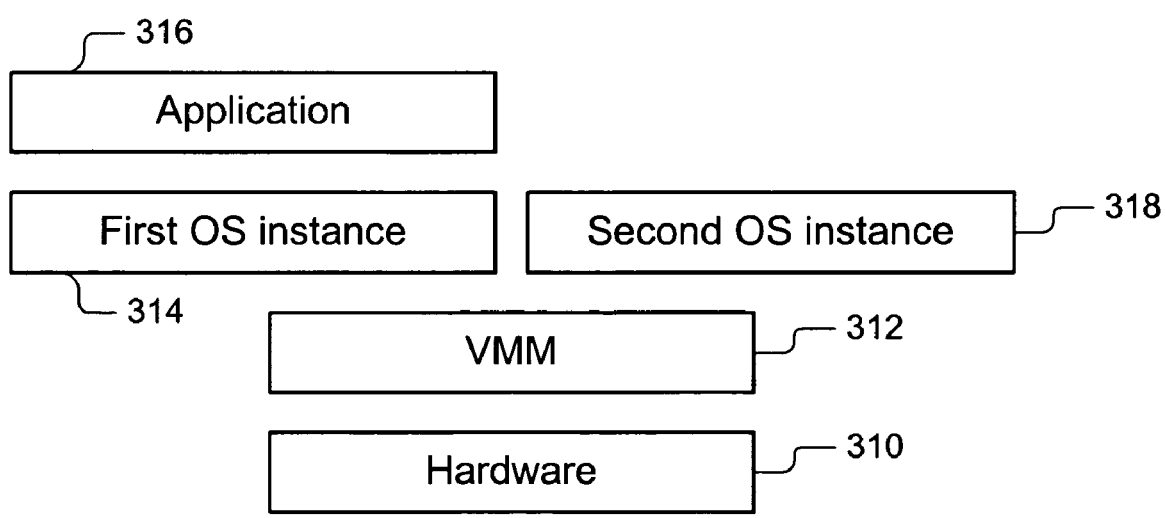
Figure 3C:
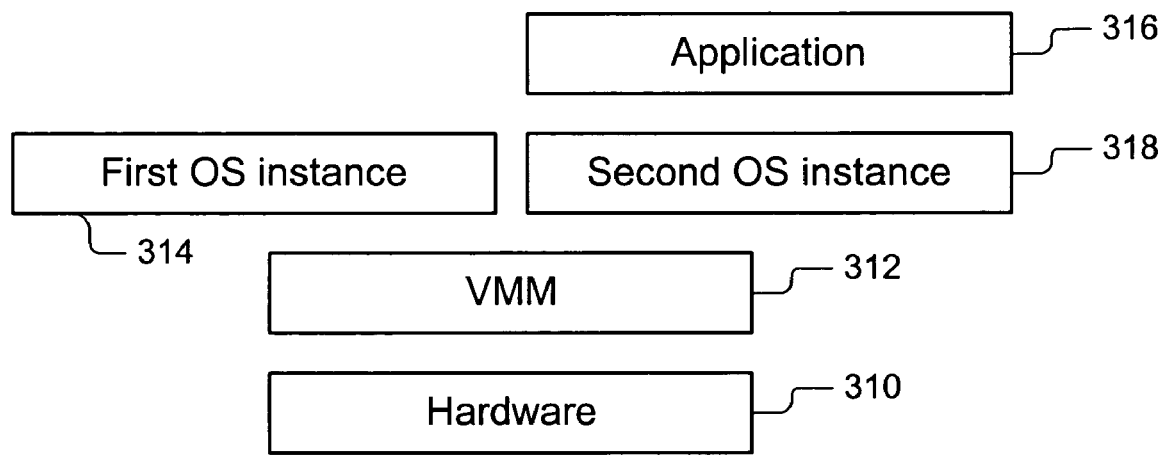

The VMM 312 creates a second OS instance 318, which does not have a dependency on the hardware to be removed (FIG. 3b). When the second OS instance is created, it attempts to discover hardware in the computer. However, the VMM can prevent or shield an OS instance from seeing the hardware to be removed. Shielding can be performed in any number of ways. As an example, a platform has firmware that handles hardware resource discovery by probing the hardware and filling in a hardware description table. The firmware then passes the table to a booting OS instance to identify the hardware resources. Before, the table is passed to the booting OS instance, however, the VMM or other privileged software entity modifies the table to prevent the OS from seeing the hardware to be removed.

As another example, the VMM can trap I/O space "probes", and misinform the booting second OS instance about the result of a probe. During boot, an OS typically determines a hardware configuration by probing I/O space and by querying various registers maintained by the hardware. For example, the booting OS instance might read an address associated with each slot in a PCI bus. A value of −1, for example, could indicate that the slot is empty. By trapping those probes and queries and setting the values (e.g., returning a value of −1), the VMM 312 can make sure that the second OS instance 318 doesn't discover the hardware to be removed.

Figure 3D:
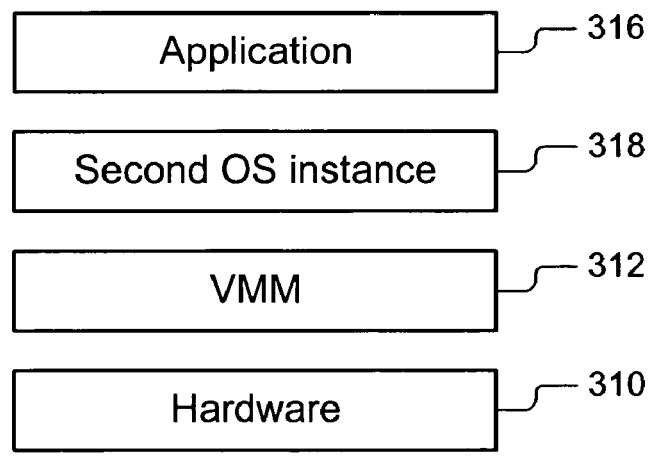

The VMM 312 migrates the application 316 from the first OS instance 314 to the second OS instance 318 (FIG. 3c), and thereafter shuts down the first OS instance (FIG. 3d). Before removing the hardware, the system administrator may invoke a program that instructs the node to prepare for device removal. For example, if the hardware change includes removing a card from a bus slot, the system administrator may invoke a program that powers down the bus slot used by that card.

Before the hardware is removed, the VMM 312 releases its own dependencies on that hardware. In many instances, this will involve shutting down the VMM driver (if any) for the hardware to be removed. The VMM 312 may also adjust its own hardware map and interrupt tables. RAM removal is slightly more complicated because the VMM's data structures can depend quite broadly on the memory to be removed. To eliminate the dependency of the VMM 312 on that memory, the VMM 312 can move any code or data it is maintaining on those physical pages to a new location (a safe range of memory), and continue to use the code or data at the new location. If the VMM 312 is designed to use virtual memory, each in-use page can be backed from the region to be moved with a new page of physical memory (by making simple changes to the page table of the VMM), and copy the old pages to the new. However, if the VMM 312 uses directly physical memory, then the code and data structures of the VMM 312 is constructed with sufficient indirection to allow their backing pages to be copied to another location.

The hardware is removed safely while the user uses the second OS instance 318 and the application 316 running on the second OS instance 318. The only time the application stopped during this maintenance was during migration. Although the length of this stoppage will depend on the particular migration technique employed, migrating an application from one OS instance to another on the same physical machine can be performed very quickly so as to be barely noticeable (if noticeable at all) to a user.

This first example can be extended to servicing other than hardware removal. For example, switches on the hardware can be flipped, pins can be set, and so forth while the second OS instance is being used. After the hardware has been serviced, the VMM could run its resource discovery algorithm to rediscover the serviced hardware.

Reference is now made to FIG. 4, which illustrates an example of adding hardware to a node. A VMM is already running in the node, a first OS instance is running on the VMM, and an application is running on the first OS instance. For example, the application is a web server, and the system administrator decides to add a memory card a month after bootup.

The administrator begins by running a program that instructs the node to prepare for hardware addition (410). For example, if the hardware addition includes adding a card to a bus slot, the program powers down that bus slot. Hardware is then added to the computer (412).

While the hardware is being added, the VMM hides the existence of the added hardware from the first OS instance (414). This may include shielding the first OS instance from interrupts by the added hardware, and trapping and emulating probes of I/O space by the first OS instance.

The VMM discovers the added hardware (416). For some servers, this may entail rerunning the VMM resource discovery algorithm. Other platforms may generate a CPU interrupt upon hardware addition, which the VMM then services. If the VMM is maintaining device drivers for the added device, the VMM triggers the relevant device driver's initialization routine. The VMM adjusts its own hardware maps and interrupt tables so that interrupts from the new hardware are serviced by the correct routines.

The VMM runs a second OS instance on the virtual machine monitor after the hardware has been added (418). The VMM allows the second OS instance to discover the added hardware (418). Exposing the hardware can involve letting I/O space probes by the booting OS "see" the existence of the added hardware. As a result, the added hardware is configured into the booting instance.

After the second OS instance has been booted, the application is migrated from the first OS instance to the second OS instance (422), and the VMM shuts down the first OS instance (424). The user continues to use the application running on the second OS instance. Thus hardware is added without incurring downtime.

Figure 5A:
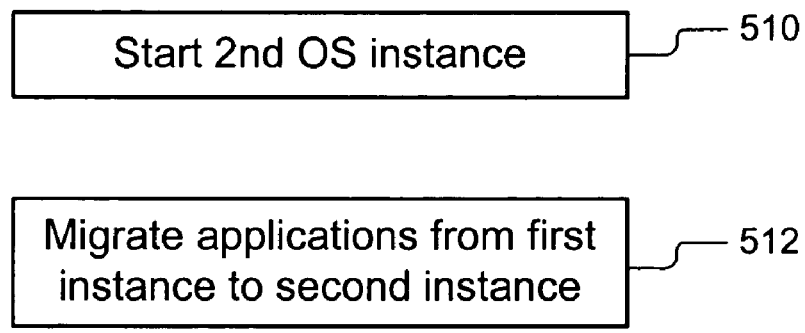
FIG. 5a is an illustration of a method of performing operating system maintenance in accordance with an embodiment of the present invention.

Reference is now made to FIG. 5*a*, which illustrates an example of performing OS maintenance on a computer already running a VMM and a first OS instance. A second OS instance is run on the virtual machine monitor (510); applications are migrated from the first instance to the second instance (512).

The software maintenance can be performed before or after the applications are migrated. The software maintenance can be performed on the applications, operating system or both. One of the instances may be shut down after maintenance and application migration have been performed.

As a first example, a second instance is booted on the VMM, where the second instance is a new version of an operating system. The applications are migrated to the second instance after the second instance has booted, and the first instance is shut down after the application migration.

As a second example, a second instance is booted on the VMM, where the second instance is an old version of the operating system. After the second instance has been booted, it is patched or upgraded. The applications are migrated from the first instance to the patched second instance. The first instance is shut down after the application migration.

As a third example, the second operating system is booted, the applications are migrated to the second instance, and the first instance is reconfigured. Reconfiguration might include changing tunable parameters, changing a domain name or IP address, etc. After being reconfigured, the first instance is restarted. Applications are migrated from the second instance to the reconfigured first instance. The second instance is shut down after application migration.

Figure 5B:
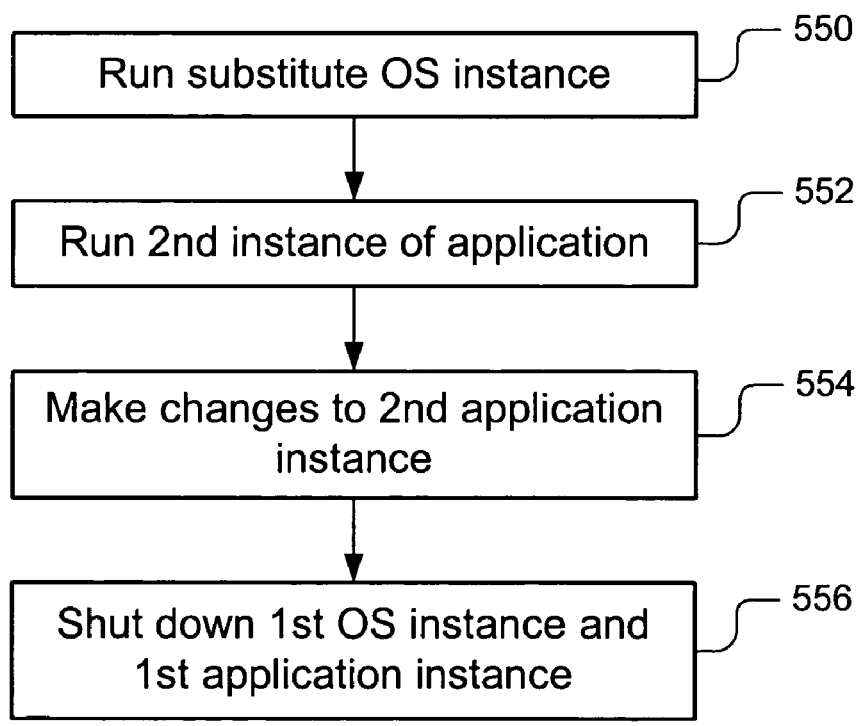
FIG. 5b is an illustration of a method of performing application maintenance in accordance with an embodiment of the present invention.

Reference is now made to FIG. 5*b*, which illustrates an example of performing maintenance on an application. Prior to maintenance, a first instance of the application is running on a first OS instance, and the first OS instance running on a VMM. The application maintenance may include running a substitute OS instance on the VMM (550), running a second instance of the application on the substitute OS instance (552), and making changes to the second application instance (554). After the changes have been made, a cut over is made from the first application instance to the second application instance (e.g., by redirecting a request stream from the first application instance to the second application instance). The first OS instance and first application instance are then shut down (556).

The first and second application instances could be run on the same OS instance instead of different OS instances. However, there are advantages to running the first and second application instances on different OS instances. One advantage is the avoidance of conflicts between the two application instances.

The virtual machine monitor adds overhead to the node. This overhead can reduce performance of the node. However, various approaches may be used to reduce the overhead.

As a first example, the virtual machine monitor partitions hardware to reduce the overhead. Such a virtual machine monitor is disclosed in assignee's U.S. Ser. No. 10/676,921 filed Oct. 1, 2003, which is incorporated herein by reference.

Figure 6:
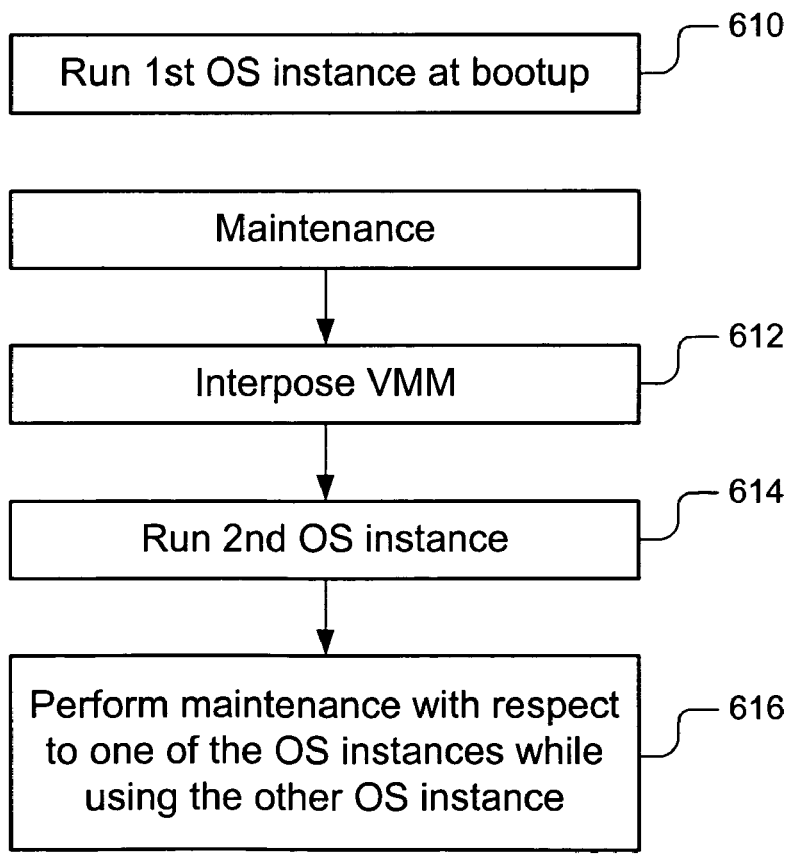
FIG. 6 is an illustration of a method of performing online computer maintenance in accordance with another embodiment of the present invention.

As a second example, the first OS instance is booted on the hardware prior to running the VMM (610). When the maintenance is to be performed (612), the VMM is interposed beneath the first operating system instance, the second OS instance is run on the VMM (614), and the maintenance is performed with respect to one of the OS instances while using the other of the instances (616). This method is illustrated in FIG. 6. Interposition of a VMM is disclosed in assignee's U.S. Ser. No. 10/676,557 filed Oct. 1, 2003, which is incorporated herein by reference.

Figure 7:
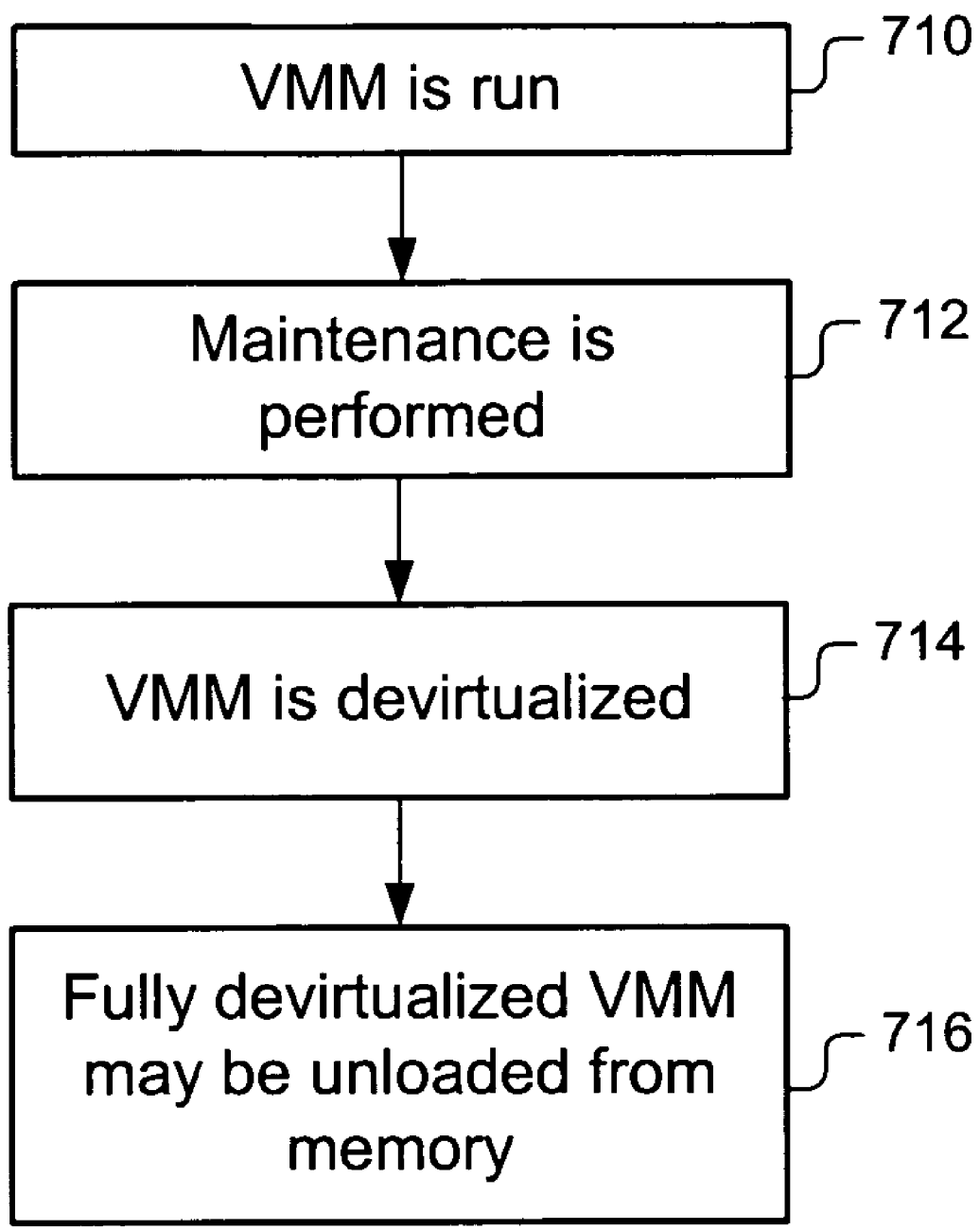
FIG. 7 is an illustration of a method of performing online computer maintenance in accordance with yet another embodiment of the present invention.

A third example is illustrated in FIG. 7. A VMM is run on a node (710), and maintenance is performed (712). After the maintenance has been performed, the VMM is devirtualized (714). The devirtualization may be partial or full. Full devirtualization includes devirtualizing the CPU, memory and I/O of the node. Partial devirtualization includes devirtualizing any one or two of the CPU, memory and I/O Devirtualization of memory is disclosed in assignee's U.S. Ser. No. 10/677,159 filed Oct. 1, 2003 which is incorporated herein by reference; and devirtualization of I/O is disclosed in assignee's U.S. Ser. No. 10/676,922 filed Oct. 1, 2003, which is also incorporated herein by reference. Full devirtualization is also disclosed in assignee's U.S. Ser. No. 10/676,557 filed Oct. 1, 2003. If the VMM is fully devirtualized, it may be unloaded from memory (716).

Thus disclosed are non-invasive methods of performing maintenance on a computer, without shutting down the computer. The maintenance is non-invasive because it does not require re-engineering of the operating system and hardware. The maintenance can be performed on legacy systems that don't support hot swapping and other forms of on-line maintenance.

The present invention is not limited to the specific embodiments described and illustrated above. Instead, the present invention is construed according to the claims that follow.

The invention claimed is:

1. A method of performing online computer maintenance on at least one node, the method comprising:
   running a virtual machine monitor;
   running a first operating system instance on the virtual machine monitor;
   configuring hardware to trap instructions executed by the first operating system instance;
   simulating trapped instructions with the virtual machine monitor;
   running a second operating system instance on the virtual machine monitor as a substitute for the first operating system instance; and
   performing the maintenance with respect to the first operating system instance while using the second operating system instance, wherein the maintenance includes servicing additional hardware or software, and the virtual machine monitor shields the first operating system instance from the additional hardware or the software as the additional hardware or the software is being added by configuring the hardware to trap instructions and by simulating the trapped instruction with the virtual machine monitor.

2. The method of claim 1, wherein the second operating system instance is run as a substitute by migrating at least one application from the first operating system instance to the second operating system instance, and using the migrated applications on the second operating system instance.

3. The method of claim 1, further comprising shutting down the first operating system instance after the second operating system instance has been run as a substitute for the first operating system instance.

4. The method of claim 1, wherein the maintenance includes hardware servicing; and
   wherein the second operating system instance is run without a dependency on hardware to be serviced.

5. The method of claim 4, wherein the servicing includes removing hardware from the at least one node.

6. The method of claim 4, wherein the virtual machine monitor is used to hide hardware to be serviced from the second operating system instance during bootup of the second operating system instance.

7. The method of claim 4, wherein the virtual machine monitor releases its own dependencies on hardware prior to removal.

8. The method of claim 1, wherein the maintenance includes adding the hardware;
   wherein the virtual machine monitor discovers the hardware; and wherein the virtual machine monitor shields the first operating system instance from the hardware as the hardware is being added.

9. The method of claim 8, wherein the hardware is added before the second operating system instance is booted; and wherein the second operating system instance is allowed during bootup to see the hardware.

10. The method of claim 1, wherein applications running on the first operating system instance are migrated to the second operating system instance; and wherein software maintenance is performed.

11. The method of claim 10, further comprising shutting down one of the first and second operating system instances after the applications have been migrated.

12. The method of claim 1, wherein the second operating system instance is an upgraded operating system; and wherein applications running on the first operating system instance are migrated to the second operating system instance.

13. The method of claim 1, wherein the maintenance includes modifying the second operating system instance; and wherein the method further includes migrating applications running on the first operating system instance to the second operating system instance.

14. The method of claim 1, further comprising migrating applications from the first operating system instance to the second operating system instance before the maintenance is performed; migrating the applications from the second operating system instance back to the first operating system instance after the maintenance has been performed; and shutting down the second operating system instance following the application migration to the first operating system instance.

15. The method of claim 1, wherein a first application instance is running on the first operating system instance before the maintenance is performed; and wherein the maintenance includes running a second application instance on the second operating system instance, modifying the second application instance, and cutting over from the first application instance to the modified second application instance.

16. The method of claim 1, wherein the virtual machine monitor allows at least one of the first and second operating system operating system instances to have direct control over at least one of a processing unit, memory and I/O of the at least one node.

17. The method of claim 1, wherein the first operating system instance is booted prior to running the virtual machine monitor; and wherein the virtual machine monitor is interposed beneath the first operating system instance when maintenance is to be performed.

18. The method of claim 1, wherein at least one of a processing unit, memory and I/O is devirtualized after the maintenance has been performed.

19. The method of claim 1, wherein a single processor is used to run the virtual machine monitor and the first and second operating system instances.

20. The method of claim 1, wherein a single node is used to run the virtual machine monitor and the first and second operating system instances.

21. A node comprising a processing unit and memory for the processing unit, the memory encoded with a virtual machine monitor and an operating system, the virtual machine monitor running a second instance of the operating system when a first instance of the operating system is already running in the node, the second instance being run when maintenance is to be performed, the second instance being a substitute for the first instance, the virtual machine monitor allowing the maintenance to be performed with respect to the first instance while using the second instance wherein the virtual machine monitor configures hardware to trap privileged instructions to create an illusion that the first instance has control of the hardware, wherein the maintenance includes servicing additional hardware or software, and the virtual machine monitor shields the first instance from the additional hardware or the software as the additional hardware or the software is being added by configuring the hardware to trap instructions and by simulating the trapped instruction with the virtual machine monitor.

22. The node of claim 21, wherein the second instance is run as a substitute by migrating at least one application from the first instance to the second instance, and using the at least one application on the second instance.

23. The node of claim 21, wherein the virtual machine monitor shuts down the first instance after the second instance has been run as a substitute for the first instance.

24. The node of claim 21, wherein the virtual machine monitor is used to hide hardware to be serviced from the second instance during bootup of the second instance.

25. The node of claim 21, wherein the maintenance includes adding hardware; wherein the virtual machine monitor discovers the added hardware; and wherein the virtual machine monitor shields the first instance from the added hardware as the added hardware is being added.

26. The node of claim 25, wherein the added hardware is added before the second instance is booted; and wherein during bootup the virtual machine monitor allows second instance to see the added hardware.

27. The node of claim 21, wherein applications running on the first instance are migrated to the second instance; and wherein software maintenance is performed.

28. The node of claim 21, wherein the maintenance includes modifying the second instance; and wherein applications running on the first instance are migrated to the second instance.

29. The node of claim 21, wherein applications are migrated from the first instance to the second instance before the maintenance is performed; the applications are migrated from the second instance back to the first instance after the maintenance has been performed; and wherein the virtual machine monitor shuts down the second instance after the applications are migrated to the first instance.

30. The node of claim 21, wherein the virtual machine monitor allows at least one of the first and second instances to have direct control over at least one of a processing unit, memory and I/O of the at least one node.

31. The node of claim 21, wherein the first instance is booted prior to running the virtual machine monitor; and wherein the virtual machine monitor is interposed beneath the first instance when maintenance is to be performed.

32. The node of claim 21, wherein the virtual machine monitor devirtualizes at least one of a processing unit, memory and I/O after the maintenance has been performed.

33. An article for a processing unit of a node, the article comprising computer memory encoded with a virtual machine monitor for running first and second instances of an operating system, the second instance being run when maintenance on the node is to be performed, the second instance being a substitute for the first instance, the virtual machine monitor allowing the maintenance to be performed with respect to the first instance while using the second instance, wherein the virtual machine monitor configures hardware to trap instructions to create an illusion that the first instance has control of the hardware, wherein the maintenance includes servicing additional hardware or software, and the virtual machine monitor shields the first operating system instance from the additional hardware or the software as the additional hardware or the software is being added by configuring the hardware to trap instructions and by simulating the trapped instruction with the virtual machine monitor.

34. The article of claim 33, wherein the virtual machine monitor shuts down the first instance after the second instance has been run as a substitute for the first instance.

35. The article of claim 33, wherein the virtual machine monitor is used to hide hardware to be serviced from the second instance during bootup of the second instance.

36. The article of claim 33, wherein the maintenance includes adding hardware;
wherein the virtual machine monitor discovers the added hardware; and wherein the virtual machine monitor shields the first instance from the added hardware as the added hardware is being added.

37. The article of claim 36, wherein the added hardware is added before the second instance is booted; and wherein during bootup the virtual machine monitor allows the second instance to see the added hardware.

38. The article of claim 33, wherein the virtual machine monitor causes applications running on the first instance to be migrated to the second instance in order to perform software maintenance.

39. The article of claim 33, wherein the maintenance includes modifying the second instance; and wherein the virtual machine monitor causes applications running on the first instance to be migrated to the second instance.

40. The article of claim 33, wherein the virtual machine monitor causes applications to be migrated from the first instance to the second instance before the maintenance is performed; wherein the virtual machine monitor causes the applications to be migrated from the second instance back to the first instance after the maintenance has been performed; and wherein the virtual machine monitor shuts down the second instance after the applications are migrated to the first instance.

41. The article of claim 33, wherein the virtual machine monitor allows at least one of the first and second instances to have direct control over at least one of a processing unit, memory and I/O of the at least one node.

42. The article of claim 33, wherein first instance is booted prior to running the virtual machine monitor; and wherein the virtual machine monitor is interposed beneath the first instance when maintenance is to be performed.

43. The article of claim 33, wherein the virtual machine monitor can devirtualize at least one of a processing unit, memory and I/O after the maintenance has been performed.

* * * * *

UNITED STATES PATENT AND TRADEMARK OFFICE
CERTIFICATE OF CORRECTION

| | | |
|---|---|---|
| PATENT NO. | : 7,451,443 B2 | |
| APPLICATION NO. | : 10/676665 | |
| DATED | : November 11, 2008 | |
| INVENTOR(S) | : David E. Lowell et al. | |

It is certified that error appears in the above-identified patent and that said Letters Patent is hereby corrected as shown below:

On the title page, in item (75), in "Inventors", in column 1, line 2, delete "Caroline M. Tic" and insert -- Caroline M. Tice --, therefor.

In column 8, line 48, in Claim 16, before "instances" delete "operating system".

Signed and Sealed this

Fourteenth Day of April, 2009

JOHN DOLL
*Acting Director of the United States Patent and Trademark Office*